(12) United States Patent
De Landstheer et al.

(10) Patent No.: US 7,827,146 B1
(45) Date of Patent: Nov. 2, 2010

(54) STORAGE SYSTEM

(75) Inventors: Jan De Landstheer, Ghent (BE); Koen D'Hondt, The Hague (NL)

(73) Assignee: Symantec Operating Corporation, Mountain View, CA (US)

( * ) Notice: Subject to any disclaimer, the term of this patent is extended or adjusted under 35 U.S.C. 154(b) by 375 days.

(21) Appl. No.: 11/731,112

(22) Filed: Mar. 30, 2007

(51) Int. Cl.
G06F 7/00 (2006.01)
G06F 17/00 (2006.01)
G06F 13/00 (2006.01)
G06F 13/28 (2006.01)

(52) U.S. Cl. ...................................... 707/651; 711/117
(58) Field of Classification Search ........................ None
See application file for complete search history.

(56) References Cited

U.S. PATENT DOCUMENTS

| | | | |
|---|---|---|---|
| 5,561,421 A | 10/1996 | Smith | |
| 5,990,810 A | 11/1999 | Williams | |
| 6,141,784 A | 10/2000 | Davis | |
| 6,292,492 B1 * | 9/2001 | Bonomi et al. ............... | 370/415 |
| 6,427,152 B1 * | 7/2002 | Mummert et al. ............ | 707/102 |
| 6,564,219 B1 * | 5/2003 | Lee et al. ...................... | 707/769 |
| 6,865,655 B1 | 3/2005 | Andersen | |
| 6,912,548 B1 * | 6/2005 | Black .......................... | 709/229 |
| 7,028,158 B1 * | 4/2006 | Beatty et al. ................. | 711/202 |
| 7,055,008 B2 | 5/2006 | Niles | |
| 7,136,976 B2 | 11/2006 | Saika | |
| 7,146,429 B2 | 12/2006 | Michel | |
| 7,257,104 B2 | 8/2007 | Shitama | |
| 7,257,643 B2 | 8/2007 | Mathew | |
| 7,269,604 B2 * | 9/2007 | Moore et al. ................ | 1/1 |
| 7,318,072 B2 | 1/2008 | Margolus | |
| 7,389,394 B1 | 6/2008 | Karr | |
| 7,409,523 B2 | 8/2008 | Pudipeddi | |
| 7,454,592 B1 | 11/2008 | Shah | |
| 7,478,113 B1 | 1/2009 | De Spiegeleer | |
| 7,587,570 B2 * | 9/2009 | Sarkar et al. ................ | 711/170 |
| 7,653,832 B2 * | 1/2010 | Faibish et al. ................ | 714/7 |
| 7,680,804 B2 * | 3/2010 | Upendran et al. ................ | 1/1 |

(Continued)

OTHER PUBLICATIONS

U.S. Appl. No. 11/403,379, filed Apr. 13, 2006 entitled "Parallel Backup".

(Continued)

*Primary Examiner*—Mohammad Ali
*Assistant Examiner*—Patrick A Darno
(74) *Attorney, Agent, or Firm*—Rory D. Rankin; Meyertons, Hood, Kivlin, Kowert & Goetzel, P.C.

(57) ABSTRACT

The present invention can provide an OS independent system for storing data within a storage system. The invention can provide a directory system which is designed dynamically to adapt based upon the caching memory available for searching directories. Received files can be stored in a current directory until a predetermined limit is reached. In parallel, a database can be created to record which files are stored in which directory. This database can be designed to be kept in physical memory to minimize file access latency. This arrangement provides that a data storage system can store data in a simple order of receipt manner while also managing the storage structure to limit the number of data objects in any given container, thus preventing a search function analysing any given container from needing to access an excessive number of data objects and thus slow down the search to an unacceptable level.

17 Claims, 10 Drawing Sheets

U.S. PATENT DOCUMENTS

| | | | |
|---|---|---|---|
| 2001/0045962 A1 | 11/2001 | Lee | |
| 2004/0078630 A1 | 4/2004 | Niles | |
| 2004/0128325 A1* | 7/2004 | Saika | 707/200 |
| 2004/0133609 A1* | 7/2004 | Moore et al. | 707/200 |
| 2005/0027766 A1 | 2/2005 | Ben | |
| 2005/0204108 A1 | 9/2005 | Ofek | |
| 2005/0262316 A1* | 11/2005 | Obayashi et al. | 711/162 |
| 2005/0262516 A1* | 11/2005 | Chow et al. | 719/315 |
| 2006/0156059 A1* | 7/2006 | Kitamura | 714/6 |
| 2006/0161518 A1* | 7/2006 | Lacapra | 707/2 |
| 2007/0083575 A1* | 4/2007 | Leung et al. | 707/205 |
| 2007/0162359 A1* | 7/2007 | Gokhale et al. | 705/28 |
| 2007/0198659 A1 | 8/2007 | Lam | |
| 2007/0220199 A1* | 9/2007 | Moore et al. | 711/112 |
| 2007/0260830 A1* | 11/2007 | Faibish et al. | 711/162 |
| 2007/0260842 A1* | 11/2007 | Faibish et al. | 711/170 |
| 2008/0005468 A1* | 1/2008 | Faibish et al. | 711/114 |
| 2008/0028058 A1* | 1/2008 | Shaw et al. | 709/223 |

OTHER PUBLICATIONS

U.S. Appl. No. 11/404,105, filed Apr. 13, 2006 entitled "Routing".

* cited by examiner

| CONTENT ROUTER | FINGERPRINT RANGE |
|---|---|
| 1 | 0000 - 3FFF |
| 2 | 4000 - 7FFF |
| 3 | 8000 - BFFF |
| 4 | C000 - FFFF |

STORAGE SYSTEM

FIELD

The present invention relates to storage system, and in particular, but not exclusively to operating system independent system for storing data in a data archival and/or backup environment.

BACKGROUND

In data archival and/or backup environments, there is often a need to store data objects such as files within an archival/backup system. Storing such data objects in such systems often uses single instancing to attempt to prevent multiple copies of the same data object being stored in the archival/backup environment.

In data archival and/or backup environments, there is often a need to store many data objects such within an archival/backup system. As the total stored volume increases, the performance within the archival/backup system can decrease markedly.

In some data archival and/or backup systems, such as conventional content addressable storage systems, the data stored at each storage node becomes a burden on the system in that searching through the records stored at the nodes in response to a query can take a very long time. In systems designed to store tens of millions of data files per storage node, the speed of searching and data access can be a critical part of overall system performance, but many conventional systems simply fail to provide the necessary performance.

The present invention has been made, at least in part, in consideration of drawbacks and limitations of such conventional systems.

SUMMARY

Viewed from a first aspect, the present invention provides an OS independent system for storing data within a storage system.

In most file/data object storage systems, it is impracticable to store all data objects in a single directory such that some structure is needed to enable the computer system hosting the data to easily search for and retrieve stored data. Thus a conventional simple directory based system is often employed to alleviate this problem, but this approach does not solve the problem and for very large numbers of files/data objects, the end directories can often end up storing in excess of 100 k files. This can result in slow and resource intensive file searching and retrieval. This problem becomes especially acute when the list of files in the directory becomes larger than the available amount of physical memory in the computer system and part of the list has to be swapped out to virtual memory to enable the remainder of the list to be loaded and searched.

The directory system of the present invention is designed dynamically to adapt based upon the caching memory available for searching directories. The present invention provides a system for storing received files in a current directory until a predetermined limit is reached. In parallel, a database is created to record which files are stored in which directory. This database is designed to be kept in physical memory to minimise file access latency.

When a data storage or access request is received at the content router, the fingerprint is then compared to the database to determine whether a file with that fingerprint has already been stored. In the case of an access request, the correct directory list is then called to allow the file to be retrieved.

The present system limits each content router to storing a predetermined maximum number of files/data objects. In one example, this limit can be approximately 50 million files or segments, as this number of files causes the database to become close to 4 GB (which is the physical memory limit for a system with a 32 bit address bus). In other examples where a 64 implementation is used, this limit could rise to the physical memory limit for a 64 bit address bus.

The system of the present invention is essentially platform independent, as it can be used on any modern operating system.

Viewed from one aspect, the present invention provides a data storage system comprising a data storage manager operable to receive a data object for storage from a remote storage agent, the data storage manager further operable to store the received data object in a storage container array, the storage container array comprising a plurality of storage containers each operable to store up to a predetermined maximum number of data objects, wherein the data storage manager is operable to cause the received data object to be stored in a currently open storage container within the storage container array and a storage location record to be kept for that data record to enable the data object to be found, and wherein data storage manager is further operable, if the currently open storage container reaches the predetermined maximum number of stored data objects, to close the currently open storage container and create a new currently open storage container within the array according to a predetermined array structure. This arrangement provides that a data storage system can store data in a simple order of receipt manner while also managing the storage structure to limit the number of data objects in any given container, thus preventing a search function analysing any given container from needing to access an excessive number of data objects and thus slow down the search to an unacceptable level.

In some embodiments, the storage location record for the data object can be kept in a database of storage location records. In some examples, the maximum number of data objects which can be stored by the data storage system is limited to enable the database of storage location records to be maintained in physical memory of a host computer of the data storage system to enable fast searching of the database to locate and thus to enable fast retrieval of a given data object. In some examples, the storage location record includes a pointer to the particular storage container in which a data object was stored and a unique identifier for that data object.

In some examples, the predetermined array structure is hierarchical and comprises containers configured to contain other containers and containers configured to contain data objects. In some examples a plurality of containers for data objects reside within a single container for containers. In some examples a plurality of tiers of container containers may be provided to provide for maximum possible storage space whilst ensuring that no container, where it stores other containers or data objects, contains too many items. In some examples, the hierarchical structure is defined using a pair of container size parameters, one parameter to define the maximum number of containers that can exist in a container container and one parameter to define the maximum number of data objects that can exist in a data object container. Thus, when the second of these parameters is exceeded in a currently open data object container, a new data object container is created. If the new data object container would cause the first parameter to be exceeded in the current container, a new container is created to house the new data object containers. Further data object containers would then be created in the new container in accordance with the second parameter until the first parameter is exceeded in the new container at which point another new container would be created. In some examples, the values of the parameters are set such that the directory information for each container fits into a single block on the physical disk which hosts the container array, the disk filesystem only needs to read one block from disk for each directory. Thus the read burden incurred when accessing a container is minimised.

In some examples a global storage counter is maintained by the data storage manager. This counter points to the next available storage location for a received data object. The counter can be a simple number which has meaning in the context of the container array by dividing the counter value by the first container size parameter to create an integer result that identifies the data object container in which the data object should be stored and where the remainder identifies the position within that data object container where the next data object should be stored. The implementation of this system allows a simple record of the next available space to be kept to prevent accidental leaving of holes in the container array and to prevent accidental overwriting of previously stored data.

In some examples a backup or archival system may include a number of data storage systems, each being configured to store a proportion of the total data objects required to be stored. In some examples, the data objects may be routed to a particular one of the data storage systems according to a unique identifier for the data object.

Further aspects of the invention can provide methods and apparatuses for implementing such a storage system. Furthermore, controlling software for causing a programmable computer system to behave as in accordance with the system, method or apparatus of the invention can be provided.

Further aspects and embodiments will be apparent from the following described examples and from the appended claims.

BRIEF DESCRIPTION OF THE FIGURES

Particular embodiments of the present invention will now be described, by way of example only, with reference to the accompanying drawings in which like parts are identified by like reference numerals.

Figure 1:
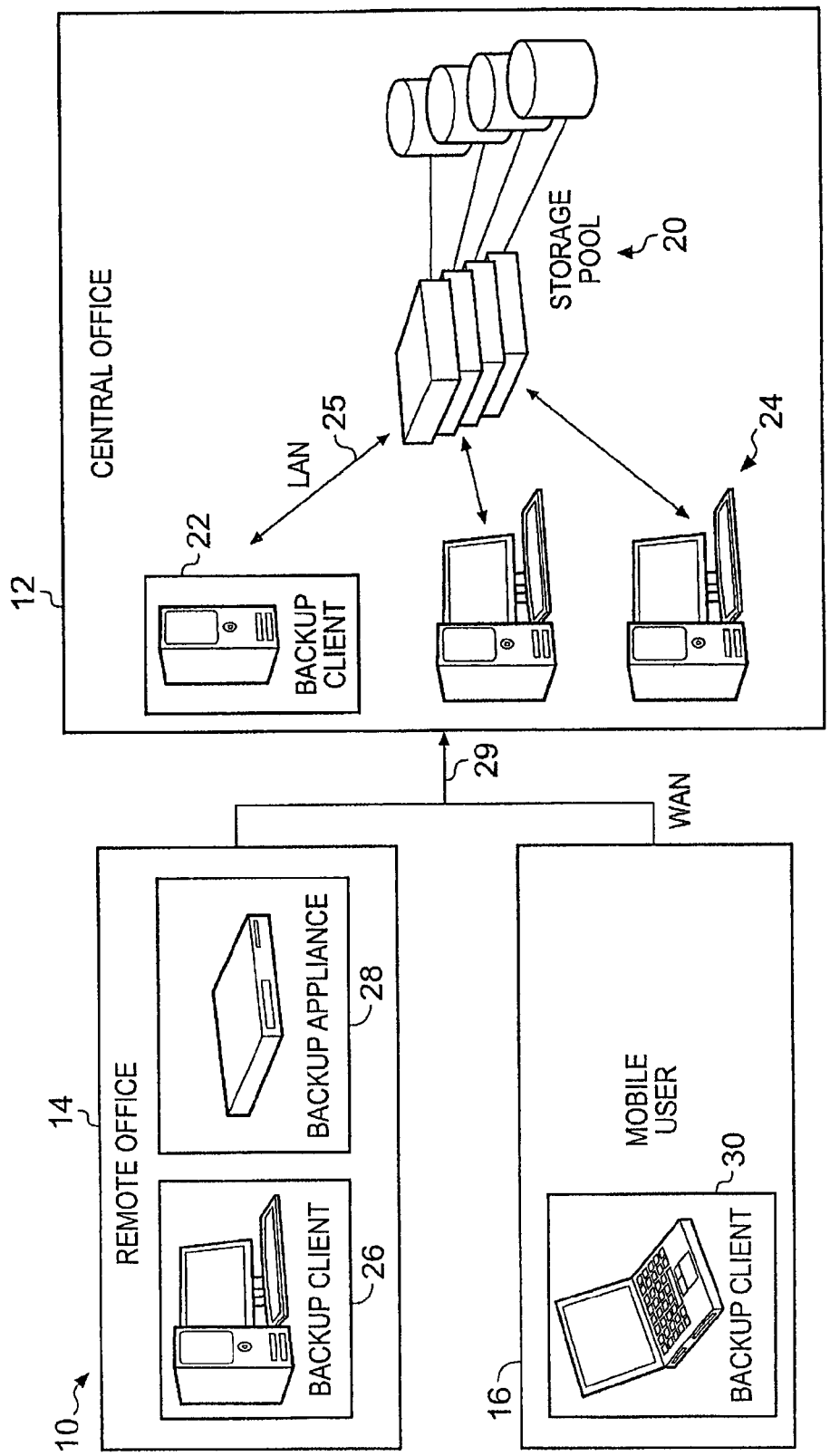
FIG. 1 shows a schematic representation of a distributed computing environment in which a data backup process may be used.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

SPECIFIC DESCRIPTION

As shown in FIG. 1, a distributed computing environment 10 may include a central office 12, and may also include one or more remote offices 14 and/or one or more remote users 16. The central office 12 may include a storage pool 20 into which data may be backed up. Management of a backup process may be performed by a backup client 22 on behalf of one or more local workstations 24. Backup data can be passed to the storage pool 20 via a LAN (local area network) 25

A remote office 14 may include one or more backup clients 26, which may be dedicated backup co-ordinators, or a backup client may be provided on workstation. By means of this backup client 26, data can be backed-up onto a remote office backup appliance 28. The backup appliance 28 can then transfer backup data to the storage pool 20 at the central office over WAN (wide area network) link 29.

A mobile user 16 may be provided with a backup client 30 to run on a remote terminal. This backup client 30 can send backup data to the storage pool 20 of the central office 12 via the WAN link 29.

In the present example, the amount of backup data to be transmitted over the LAN 25 and WAN 29 is limited by ensuring that only unique data is sent to the backup storage pool 20. Techniques for achieving this will be explained in more detail below.

Figure 2:
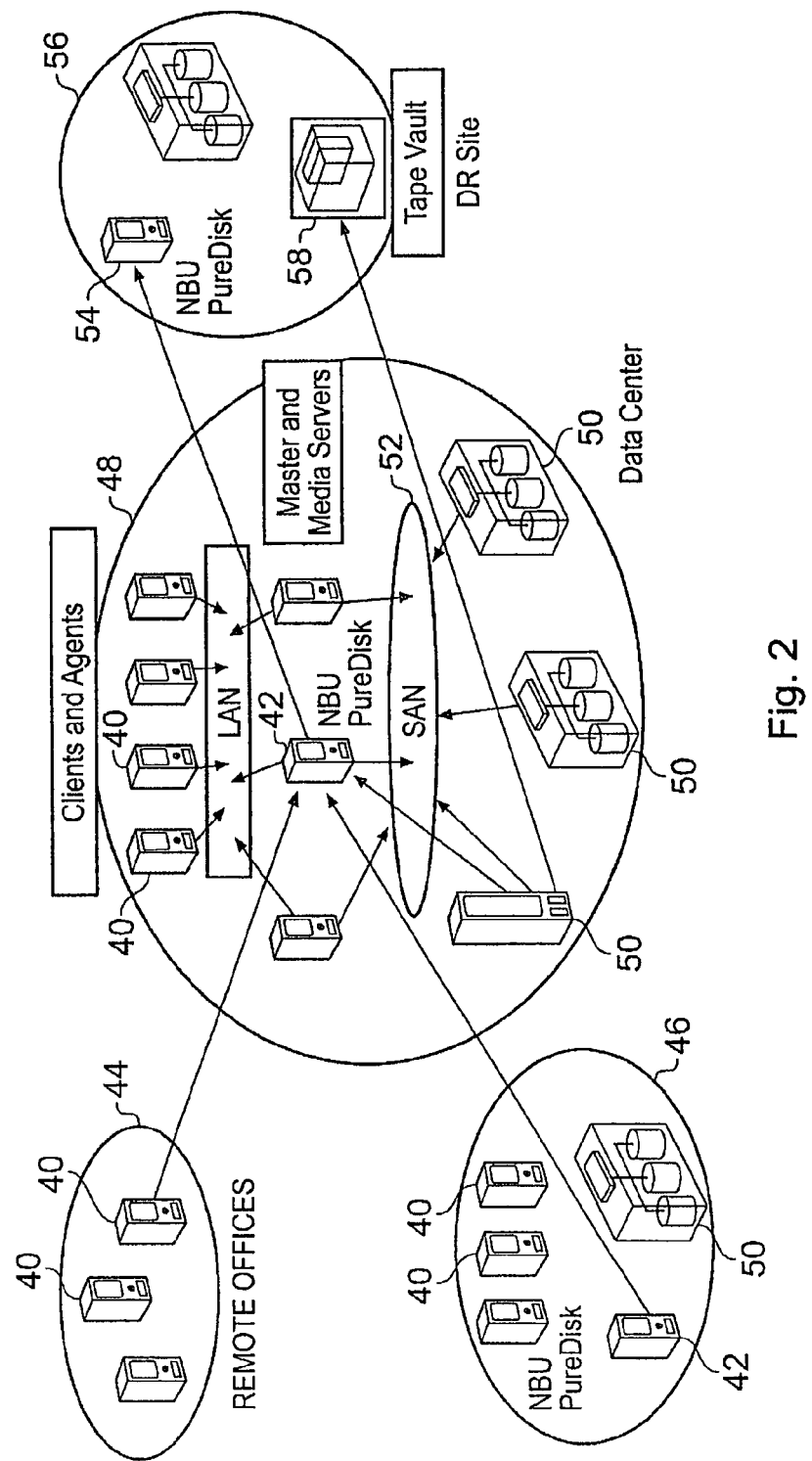
FIG. 2 shows a schematic representation of another distributed computing environment in which a data backup process may be used.

FIG. 2 shows another example implementation of a distributed computing environment. In this example, some workstations and mobile users are associated with respective local backup servers, each of which is operable to communicate with a data centre where backup storage is performed.

As shown in FIG. 2, in the present example, each computer system 40 which is to be included in the backup system runs a backup client, which may also be referred to as an agent. Each local agent identifies new and changed files or file segments as they are created and calculates a fingerprint for each file or file segment. The agents can be configured to ignore files which do not require backup such as, for example, print spool files, operating system file or temporary files.

In the present example, files larger than a predetermined threshold are divided into segments. This allows large files to be backed up more efficiently. For example, a file such as an MSOutlook™.pst file typically contains a large amount of data which remains constant and has new data appended thereto when a user sends or receives an email or makes a calendar entry, for example. Thus, when a backup operation is performed in segmented fashion, all of the segments at the beginning of the file which are unchanged need not be backup up again. This process is illustrated in FIG. 3.

Figure 3:
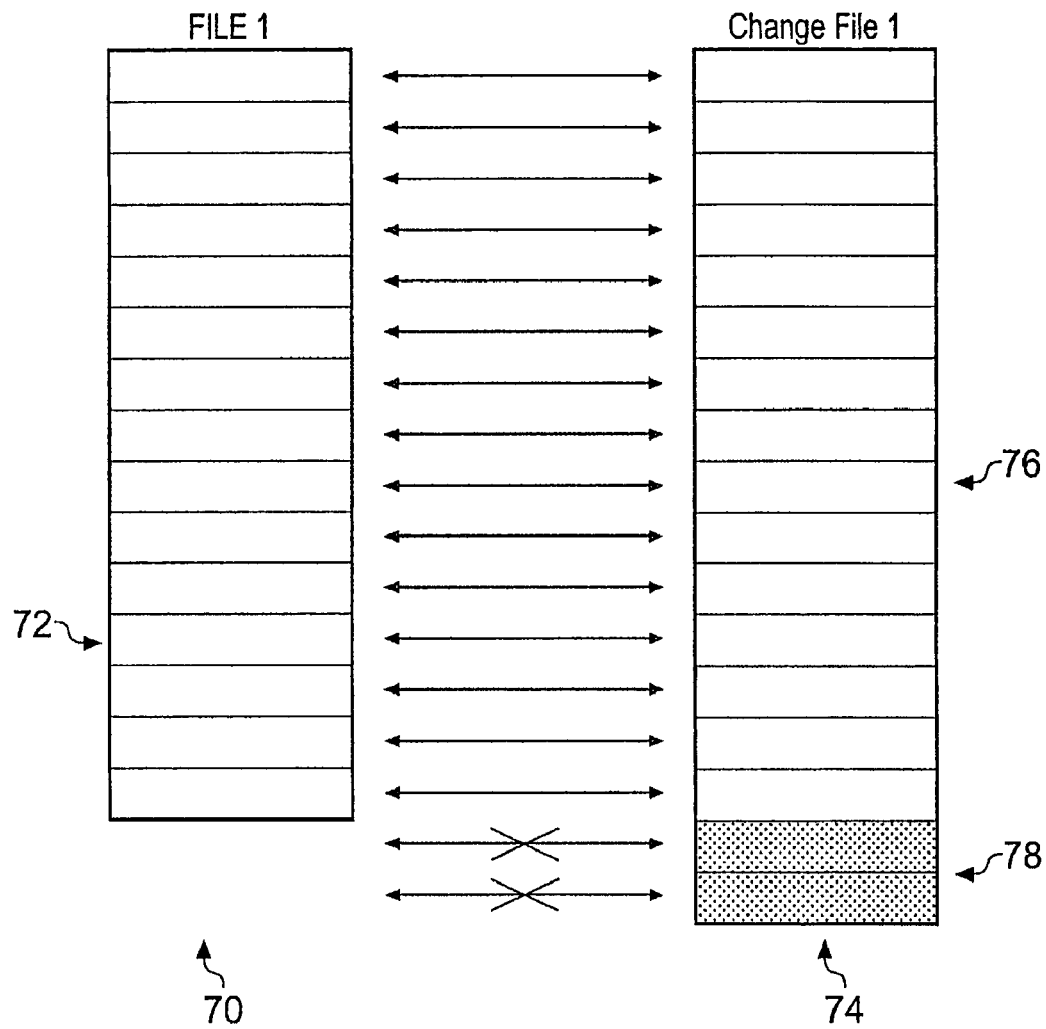
FIG. 3 shows a schematic representation of how a data file may be modified between two time points.

As shown in FIG. 3, a file 70 when last backed up was backed up as a number of backup segments 72. When a next backup operation is performed the file has increased in size to new file 74. During this backup operation, a backup agent again considers the file as a number of segments, each of which has a fingerprint calculated therefor. By comparing these fingerprints to the fingerprints included in previous backups, it can be determined that all of segments 76 have previously been backed-up and so do not require re-storing in a backup system. On the other hand, the new segments 78 have not previously been backed-up and so can be sent for backup storage. By using such a technique, the amount of data sent for backup storage on a backup operation can be reduced massively from a system where all changed files are sent for backup every time.

In the following description, the words file and segment may be used interchangeably to refer to backup data units. It will be appreciated that where a file is smaller than the predetermined segment size, the file can be considered to be segmented into a single segment. In the present examples, a variety of segment sizes can be used. As will be appreciated smaller segment sizes increase the efficiency of the backup process but increase the processing workload by the backup agent. In some examples, segment sizes of 32 kbytes, 64 kbytes or 128 kbytes can be used.

The fingerprint determined by the agent uniquely identifies the file or file segment. Thus no two non-identical files or segments can have the same fingerprint, and identical files or segments always have the same fingerprint. In the present example, the fingerprint is calculated using a hash function. Hash functions are mathematical functions which can be used to determine a fixed length message digest or fingerprint from a data item of any almost size. A hash function is a one way function—it is not possible to reverse the process to recreate the original data from the fingerprint. Hash functions are relatively slow and expensive in terms of processing power required compared to other checksum techniques such as CRC (Cyclic Redundancy Check) methods. However hash functions have the advantage of producing a unique fingerprint for each unique data set, in contrast to CRC methods which can produce the same result from multiple different data sets. Examples of hash functions which can be used to calculate the fingerprint in the present example include MD5, SHA1 and the so-called SHA2 "family" (including SHA224, SHA256, SHA 384 and SHA 512). Such hash functions produce a fingerprint (sometimes termed a "digest") which may typically be of between 128 and 1024 bits in length. Thus, as will become apparent, using only this very small representation of a much larger file or file segment, the file or segment can be tested for inclusion in a backup process with only minimal network traffic being required to carry this small signature between entities in the backup system.

The agent at each workstation 40 then identifies the files or segments which are new and unique to that workstation. Thus, if a newly created file or segment at the workstation in fact is an exact copy of a file or segment previously backed-up, then the agent knows not to send that segment for backup again.

Once the agent has identified a unique segment at the workstation 40, the fingerprint for that segment can be sent to a backup server 42, where its uniqueness can again be tested. This re-test is performed to determine whether the file which is unique to a particular workstation 40 is also unique to all workstations which that backup server 42 services. The backup server may be a local backup server as shown in remote office 46 or as shown in central network 48 with respect to the workstations 40 located within the central network 48. Alternatively, the backup server may be a remote backup server as shown in central network 48 with respect to the workstations 40 located at remote office 44. Where a workstation 40 is a mobile workstation such as a laptop, the backup agent on the mobile workstation may be configured always to connect to the same backup server, or may connect to whichever backup server is physically closest to the mobile workstation at a given time.

This process of sending a fingerprint to a higher level authority within the backup structure can be continued until the highest level authority is reached. In a large system, this might be a central backup server to which a number of local backup servers are connected. In a small system, there might be only a single backup server to service all workstations. If the fragment is determined to be unique within the backup system, the originating workstation agent can be instructed to send the actual data segment for backup.

Segments which are not unique may also have their fingerprint sent to a backup server by a backup agent. This may be the case in a system where a data retention policy is defined, to ensure that a file or segment is maintained in backup storage for a minimum period after the last time it was present on any workstation within the backup environment. In some examples it may also be necessary to ensure that all segments of a given file are present in the backup system until the expiry of a data retention requirement for that file. Thus all segments of a file may need to be kept until the end of a data retention policy period, not just the last modified segments thereof.

It will be appreciated that the workstations 40 of the present example may include file or application servers where data requiring backup is stored. For example, it may be the case that file servers are used to store many data files, so the content of these may be required to be backed up. In the example of an application server such as a MSExchange™ server, the application server may store data relating to the application and may therefore require backup. Also, application files, whether located at a workstation or a server, may require backup coverage, for example to provide a straightforward method for recovery of custom settings or rebuilding of a workstation or server following a system failure.

As mentioned above, a data retention policy may apply to data within a computer system. Such a policy may be a policy determined by a company or may be imposed by a regulatory authority. Regulator imposed policies may apply, for example in respect of financial information and legal information. For this reason, it may be desirable for a workstation backup agent to include deleted files in the backup operation to ensure that a file with an existence on a workstation of less than one backup interval is still included in the backup process.

As will be appreciated, by performing the backup process in terms of using a fingerprint typically of the order of a few tens of bits in size to determine which segments actually need backing up, the amount of data transferred over network connections between the workstations and backup servers is much reduced compared to a system where data identified for backup is sent for storage before it is determined whether storage of that data is actually required.

Returning to FIG. 2, the backup servers 42 may cause the data for backup to be stored into a storage arrangement such as a storage server 50. The storage servers 50 may be standalone storage servers or may be part of a storage infrastructure such as a SAN (storage area network) 52. In alternative examples the backup server 42 may include the storage for backed up data.

To provide redundancy and greater security and availability for backed up data, a storage server 42 may consist of a mirrored pair of storage servers, with one active and the other acting as a hot standby, ready to take over in case of a failure of the active backup server. A remote mirror 54 may be provided, for example at a remote site 56, to provide resiliency against failures affecting the location of the active backup server. Such a remote site may also be used to make and/or keep backup copies of the backed up data, for example in backup magnetic arrangements or using conventional backup techniques such as a tape vault 58.

Thus there has been described a number of examples of a backup environment for using data fingerprints to identify files and/or segments for backup and to backup only unique files and segments so as to achieve maximum efficiency in usage of backup storage volume.

In order to provide a means for accessing the files and segments in the backup system, the files and segments can be stored in an indexed file system or database structure which allows a file or segment to be identified and retrieved by a search on its fingerprint. The fingerprint may also be considered as a "signature" of the file or segment. Thereby a simple file system or database structure can be used for the files and segments, thereby allowing a swift search and retrieval process.

In order to facilitate searching the contents of a backup store of the type described above, both to assess the contents of the store, and to retrieve data from the store, a database of metadata can be provided. The database of metadata or "metabase" can store data describing each file stored into the backup system. Such data may include information such as filename, last edited date, created date, author, file size and keywords representative of the content of the file. Also stored in the metabase can be the fingerprint (or fingerprints) for the file (or each segment of the file). Thereby, a user searching the metabase for files edited on a particular date can run a query on the metabase, and any returned results can enable the files in the backup system to be retrieved by means of their uniquely identifying fingerprint. A system constructed in this way enables the metabase to have a high speed search performance due to the database size being small compared to the actual backed up file sizes, and allows a simple search procedure to be used for the file/segment database.

In another example, the file/segment and metadata databases are combined into a single database. Such a system offers a simplified structure in the sense that only a single database is required.

Figure 4:
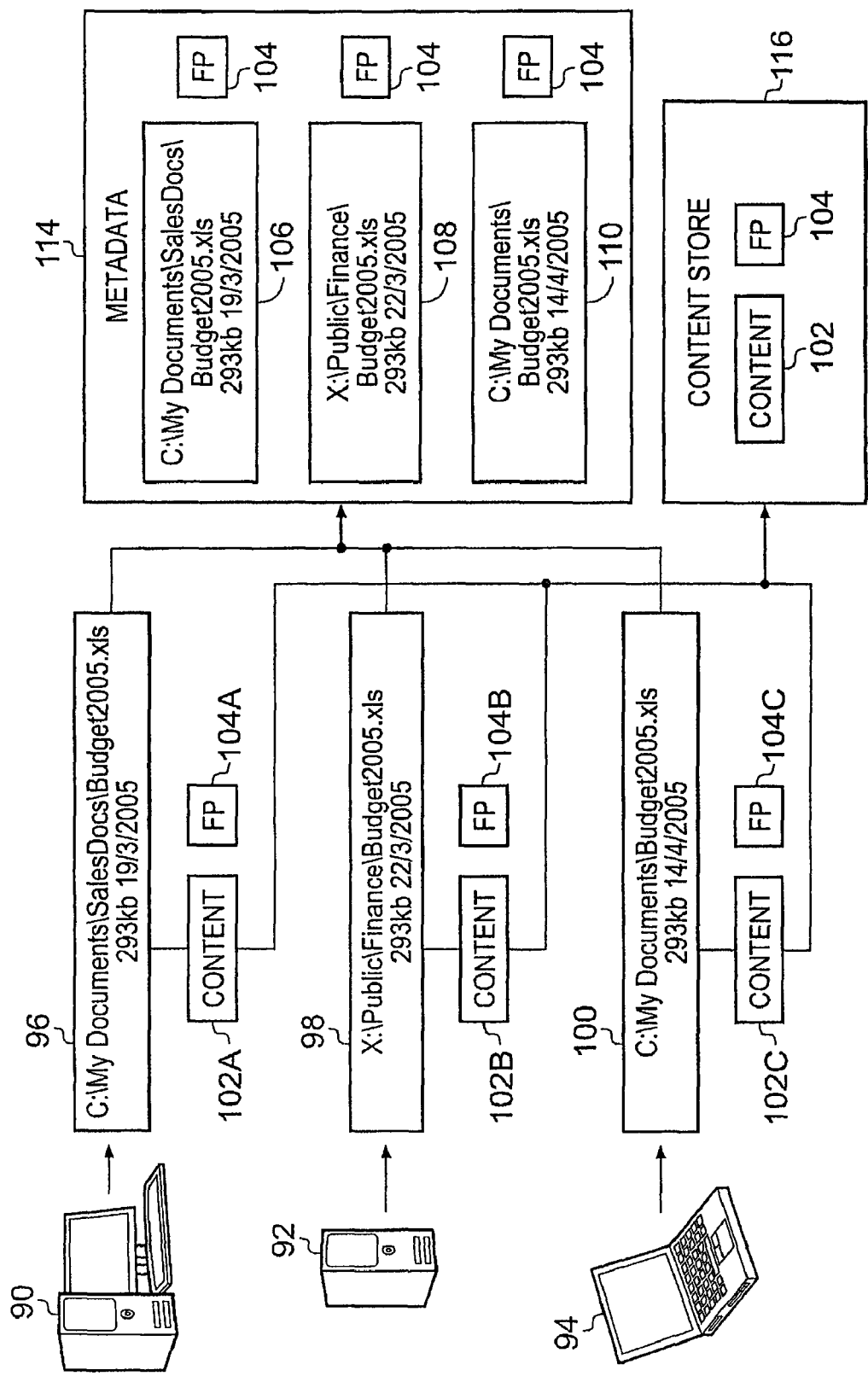
FIG. 4 shows a schematic representation of a single instancing backup system.

Returning to the separate metabase and file/segment store example, this system can be run as a single instancing store by allowing more than one entry in the metabase to include the same fingerprint. This is illustrated in FIG. 4.

In each of the three computer devices: terminal 90, file server 92 and mobile terminal 94, an identical spreadsheet file "Budget2005.xls" is stored. At the terminal 90, the file 96 was stored in the "C:\My Documents\SalesDocs\" folder on 19 Mar. 2005 having a size of 293 kB. At the file server 92, the file 98 was stored in the "X:\Public\Finance\" folder on 22 Mar. 2005 having a size of 293 kB. At the mobile terminal 94 the file 100 was stored in the "C:\My Documents\" folder on 14 Apr. 2005 having a size of 293 kB. As the files 96, 98, 100 are identical, they are all the same size, have the same content (102A, 102B, 102C respectively) and result in the same fingerprint FP (104A, 104B, 104C) being generated at a backup operation time.

Backup operations on each of the terminal 90, file server 92 and mobile terminal 94 may be carried out at different times, with the results of the backup of each being added into the backup system at the respective different times. For example, a backup operation for the mobile terminal 94 may be carried out at a time different to the backup operation for the terminal 90 or file server 92 if the mobile terminal 94 is remains unconnected to the backup system for a period of time during which a scheduled backup operation took place for the terminal 90 and file server 92.

For the performance of a backup operation for the terminal 90, the fingerprint 104A is calculated for the file 96, which fingerprint 104A is compared to the content store part 116 of the backup system. If the fingerprint is unique in the backup system, then the content 102A of the file 96 needs to be stored into the content store 116, shown as content 102 associated with fingerprint 104. If the fingerprint is not unique in the content store (i.e. if that file has previously been backed-up), then the content need not be stored again. In parallel with determining whether the content 104A needs to be stored, metadata 106 for the file 96 is stored into the metabase 114 if the file 96 has not previously been backed-up. The metadata 106 is stored in association with the fingerprint 104 which identifies the content 102 stored in the content store 116.

Similar processes are carried out when the file 98 on file server 92 and the file 100 on mobile terminal 100 are selected for backup. Thus, once the files 96, 98, 100 have each been included in a backup process, the metabase contains an entry for each of the files, as each has different metadata, but the content store has only a single copy of the file. In an alternative implementation, the metabase could have a single record for each fingerprint, with the record storing the metadata for all original instances of the file which generated the fingerprint.

Thereby, a metabase containing metadata for all original instances of a file can be provided to provide a searchable environment for retrieving files/segments stored in the content store. Meanwhile the content store contains only one instance of each file/segment, so as to limit the storage space required by the content store. The metabase records are linked to the content records in the content store by the fingerprint for each respective content record.

Thus there has now been described a system for providing a content optimised backup and/or archival solution for data networks. The system ensures that all unique data is stored whilst avoiding unnecessary storage of non-unique data. By analysing large data objects in segments, this optimisation is further enhanced.

There will now be described an arrangement for further enhancing the content optimised data backup/archival system described above. In particular, the method of determining whether a particular file or segment is previously stored is optimised by using a content routing based approach to determining storage location.

An example of a storage server system operable to store files and segments efficiently will now be described with reference to FIG. 5. The system of the present example avoids the use of broadcasts to all storage nodes and avoids the use of a storage controller for accessing the storage nodes.

Figure 5:
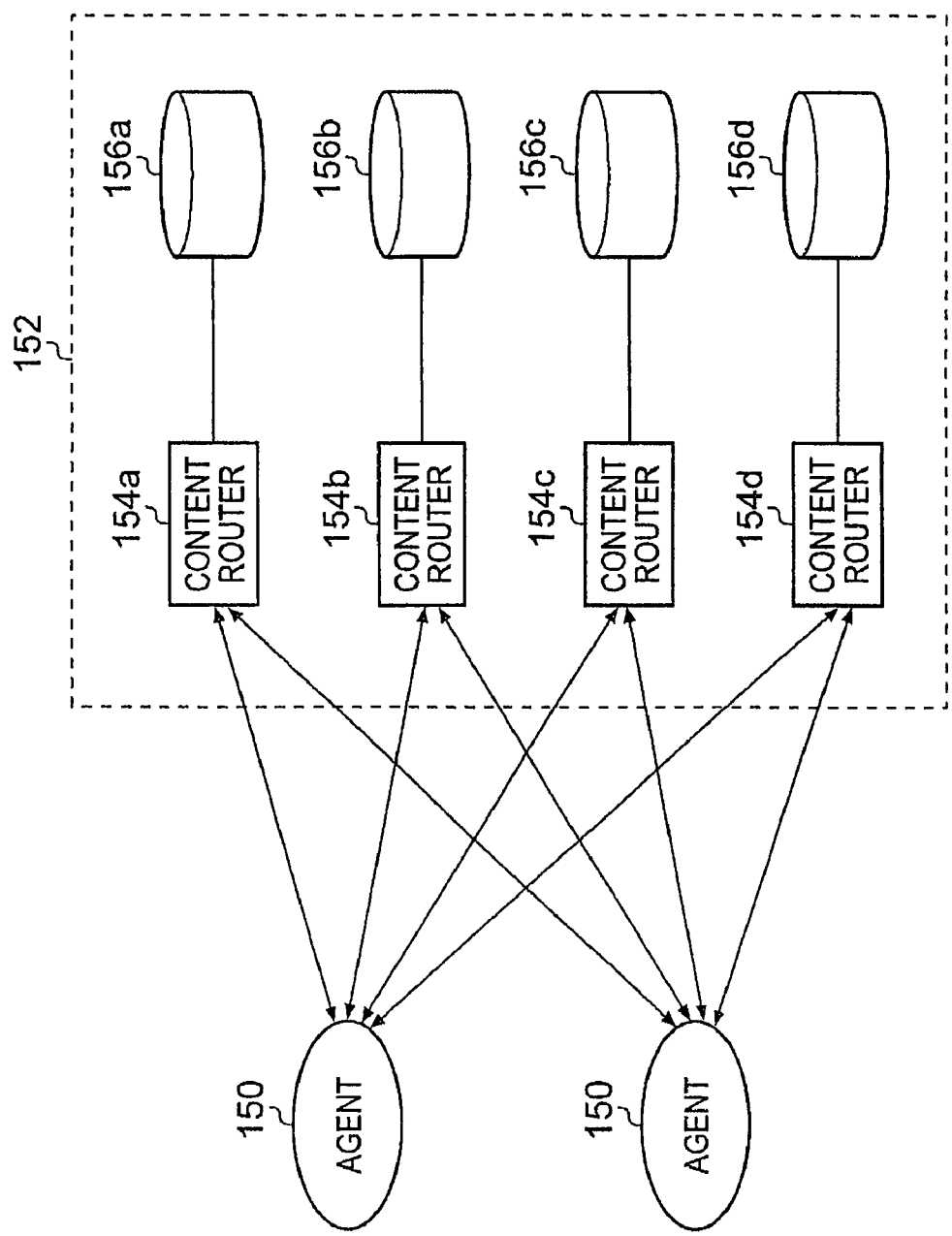
FIG. 5 shows a schematic representation of a 1-tier content routing system.

As shown in FIG. 5, individual storage agents 150 have access to a storage backend 152. Each agent 150 may be located at an individual terminal or workstation such as those shown as elements 40 in FIG. 2, or in a backup sever such as those shown as elements 42 in FIG. 2. The location of the agents can be altered in dependence upon the scale and particular implementation details of the system in question.

FIG. 5 also shows the storage backend 152 to include a number of storage elements 156*a-d*, each of which has an associated content router 154*a-d*. The storage backend 152 may be considered as equivalent to the storage pool 20 illustrated in FIG. 1. As will be appreciated, the storage backend 152 may well be made up of one or more logical storage systems overlaid onto a physical storage system. The physical storage system may include various individual physical storage servers, such as those shown as elements 50 in FIG. 2, which servers may be configured as part of a higher level storage arrangement such as a storage area network (SAN), such as that illustrated as element 52 in FIG. 2.

The locations of the logical elements of the storage backend 152 may be spreads across one or more elements or levels of a physical storage system. In the context of the example of FIG. 2, the content routers 154 may be provided in the backup server 42. Alternatively, they could be provided somewhere within the SAN 52, which could include a physical location on one of the storage servers 50. Again, using the context of the example of FIG. 2, the storage elements 156 may be provided in the backup server 42 or within the SAN 52, which could include a physical location on one of the storage servers 50. In some examples, each content router may be a separate physical or logical processing engine having storage attached directly or indirectly thereto in the form of a SAN, NAS, SCSI, iSCSI, IDE, ATA, SATA, SAS or other conventional storage technique. The storage may be redundant storage such as may be provided using a RAID system.

Figures 6, 7:
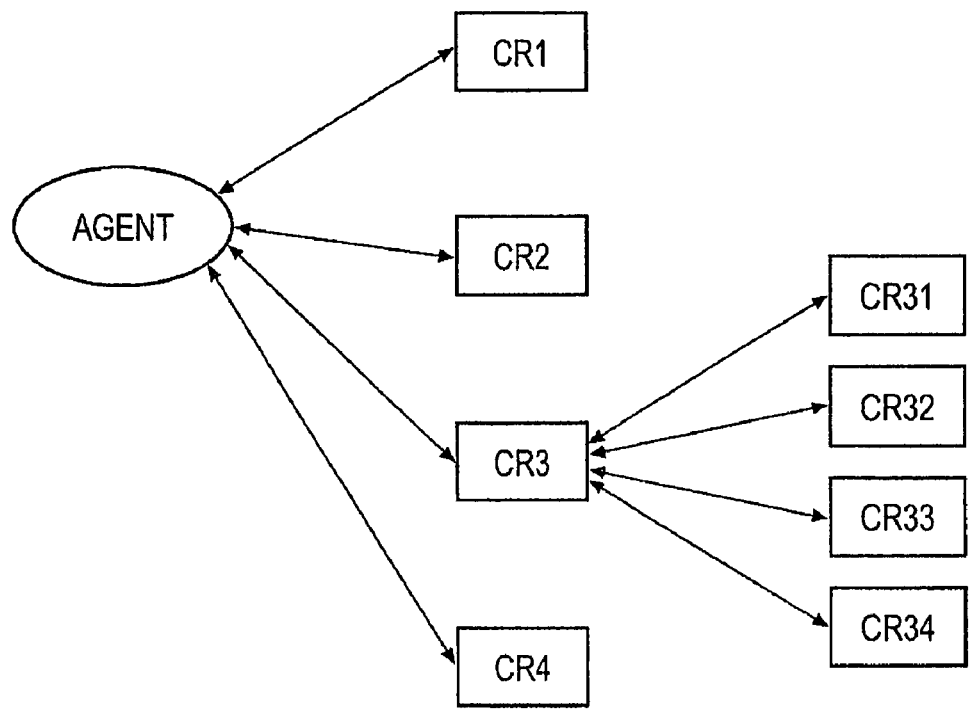
FIG. 6 shows a schematic representation of a content routing table.
FIG. 7 shows a schematic representation of a two-tier content routing system.

In order to distribute the stored data between the various content routers, a content routing table is propagated about the network to all of the storage agents. This routing table indicates a correct storage router for each file or segment. An example of a content routing table is shown in FIG. 6. As can be seen from FIG. 6, the files and segments are distributed between the content routers by fingerprint. As each storage agent knows from the table the correct content router for a given file or segment for the fingerprint, that agent can simply direct any query regarding that file or segment to the correct content router. By providing a completely deterministic system in this fashion, a minimum amount of agent to content routers bandwidth is used for each query.

The content routing table can be determined by a central authority, and distributed to all agents. The authority may be an automated storage management authority or may be one or more human administrators.

As the fingerprint is the basis for the storage location decision, in a system which uses a checksum type system for signature creation, the allocation of files/segments to storage locations is effectively random, thereby tending to protect any single content router taking an excessive share of the storage burden.

Also, as the fingerprint is the basis for the storage location decision, as the fingerprint value range is predefined, the table automatically includes an entry for every file/segment such that the table does not need to be updated to include new files/segments as they are added to the system.

As the routing decision is based on the fingerprint, which is in turn based on the content of the file or segment, it is clear that the storage location routing decision in the present examples is made on the basis of the data content of the file or segment. Any metadata associated with the file or segment can be stored with the data file or segment, or in a separate metabase (as discussed above), however the metadata is not used for the routing decision. This helps to maintain the high degree of randomness in the storage location decision.

In the example of FIG. 6, the fingerprint for each file or segment is 128 bits in length (32 hex characters). The four most significant characters of the fingerprint are used in the content routing table. In other examples, the fingerprints may be of different lengths and/or a different number of most significant characters can be used in the content routing table.

In the present example, where the most four significant characters of the fingerprint are used for content routing, up to FFFF content routers can be provided (i.e. 64 k=65535 content routers). If each content router is associated with a data storage element or data storage elements totaling 2 TB (2 terabytes) in size, this means a total storage volume of up to 128 PB (128 petabytes) can be accommodated. This total volume can be increased or decreased to match the needs of particular backup/archival environment by using more or fewer characters of the fingerprint and/or by using larger or smaller data storage elements for each content router.

Thus there has now been described a system and method for maximising the use of available bandwidth between a storage agent and a number of storers. By determining the correct storer at the storage agent using an identifier based on the content of a data object and a table matching possible identifiers to available storers, any query regarding the data object can directed to the correct storer. Thereby storers other than the one indicated in the table need not receive any communication relating to the data object. Thus bandwidth between agent and storers is not wasted by troubling storers with queries regarding data objects for which they have no responsibility.

The content routing system described above can be modified and adapted to suit a number of different circumstances and requirements.

For example, the address ranges on the content routing table can be weighted to respond to operational needs. For example, if one particular range of values in the content routing table becomes more "busy" than the other ranges, that range can be served by multiple load-balanced content routers. Referring to the example of FIG. 6, if the content router serving the address range 4000-7FFF becomes disproportionately loaded, an extra content router can be allocated the same address range and the two content routers can be configured to transparently share the load of that address range between them.

In some examples, load balancers can be "stacked" such that each storage agent sees a first group of content routers which can be accessed through the content routing table. Then, one or more members of that first group of content routers may feed further groups of content routers. With reference to FIG. 7, content router CR3 which serves address range 8000-BFFF (using the content routing table of FIG. 6) may itself feed a further set of content routers CR31, CR32, CR33 and CR34, thereby acting as an agent in respect of those further routers. These may be used to serve the address ranges 8000-8FFF, 9000-9FFF, A000-AFFF and B000-BFFF respectively. Alternatively, they may be configured to provide additional reliability by providing failover paths. For example CR31 and CR32 may both be configured to handle addresses in the range 8000-9FFF with CR31 as the default path and CR32 as a mirrored failover path. Likewise CR33 and CR34 may both be configured to handle addresses in the range A000-BFFF with CR33 as the default path and CR34 as a mirrored failover path.

In some examples, both the first tier content router CR3 and the second tier content routers CR31, CR32, CR33 and CR34 may store data. In this situation the first tier router CR3 acts as an agent to determine whether to send a query/data for storage to a second tier router or whether to keep it for its own storage.

In some examples, different content routers might have different size address spaces to handle. For example if two content routers are provided with a capacity of 1 TB each, and a third content router is provided with a capacity of 2 TB, the system could be configured to allocate an address space to the 2 TB content router which is twice the width of the address space allocated to each 1 TB content router.

In order to enable the total volume of the backup/archival system to be scaled dynamically, a content routing table can be updated to allow additional content routers to be accessed. An example of dynamic scaling is illustrated in FIG. 8.

Figure 8:
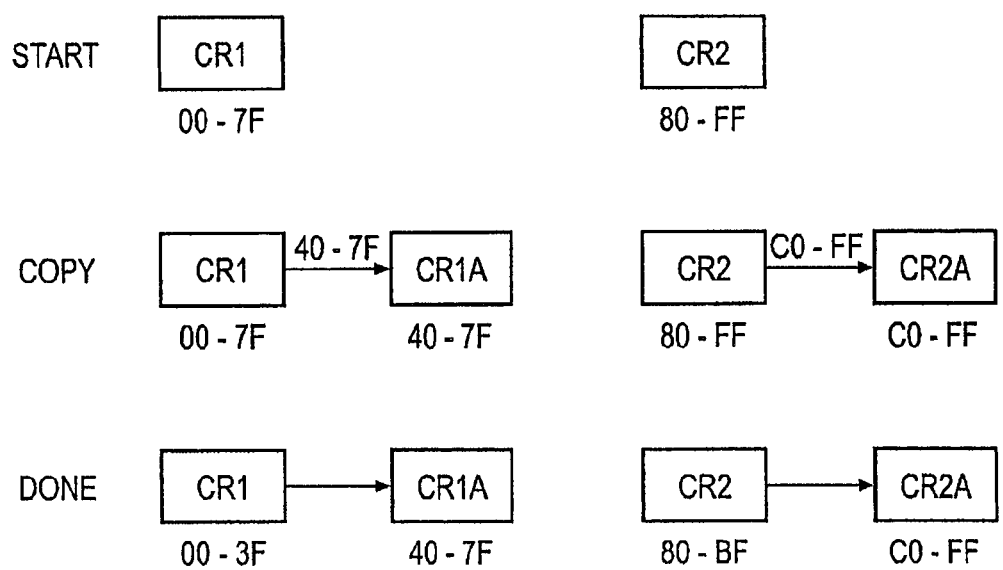
FIG. 8 shows a schematic representation of a dynamic resizing operation for a tier of a content routing system.

As shown in FIG. 8, before the dynamic scaling operation, the system comprises two content routers, with CR1 handling addresses in the range 00-7F and CR2 handling addresses in the range 80-FF. The system is at this point in need to expansion as each content router is experiencing high utilization. In one example, a threshold maximum utilization might be 90% utilization. Thus, if in the present example, each content router is responsible for 2 TB of data storage elements, the system can reach a stored data volume of 3.6 TB before expansion is required.

In order to increase the data storage volume, it is decided in the present example to introduce two new content routers, thereby bringing the total system utilization down to 45%. Thus, each of CR1 and CR2 copies the data corresponding to the upper half of its respective address range to new content routers CR1A and CR2A respectively. If it is desired to perform this system resizing dynamically (i.e. without making the system unavailable for the duration of the update) the original content routers can continue to handle queries for their entire original address range during the copy process. Alternatively, the new content routers can be placed in service immediately, using a present and previous location system to accurately route files/segments. Such a system will be described in greater detail below. Finally, after the copy is complete, there are four content routers in the system, with CR1, CR1A, CR2 and CR2A servicing addresses in the ranges 00-3F, 40-7F, 80-Bf and C0-FF respectively.

Other systems for adding content routers may be employed. For example, a single content router could be added and the addresses handled by each existing n content routers shuffled along to cover the n+1 content routers now present.

Figure 9:
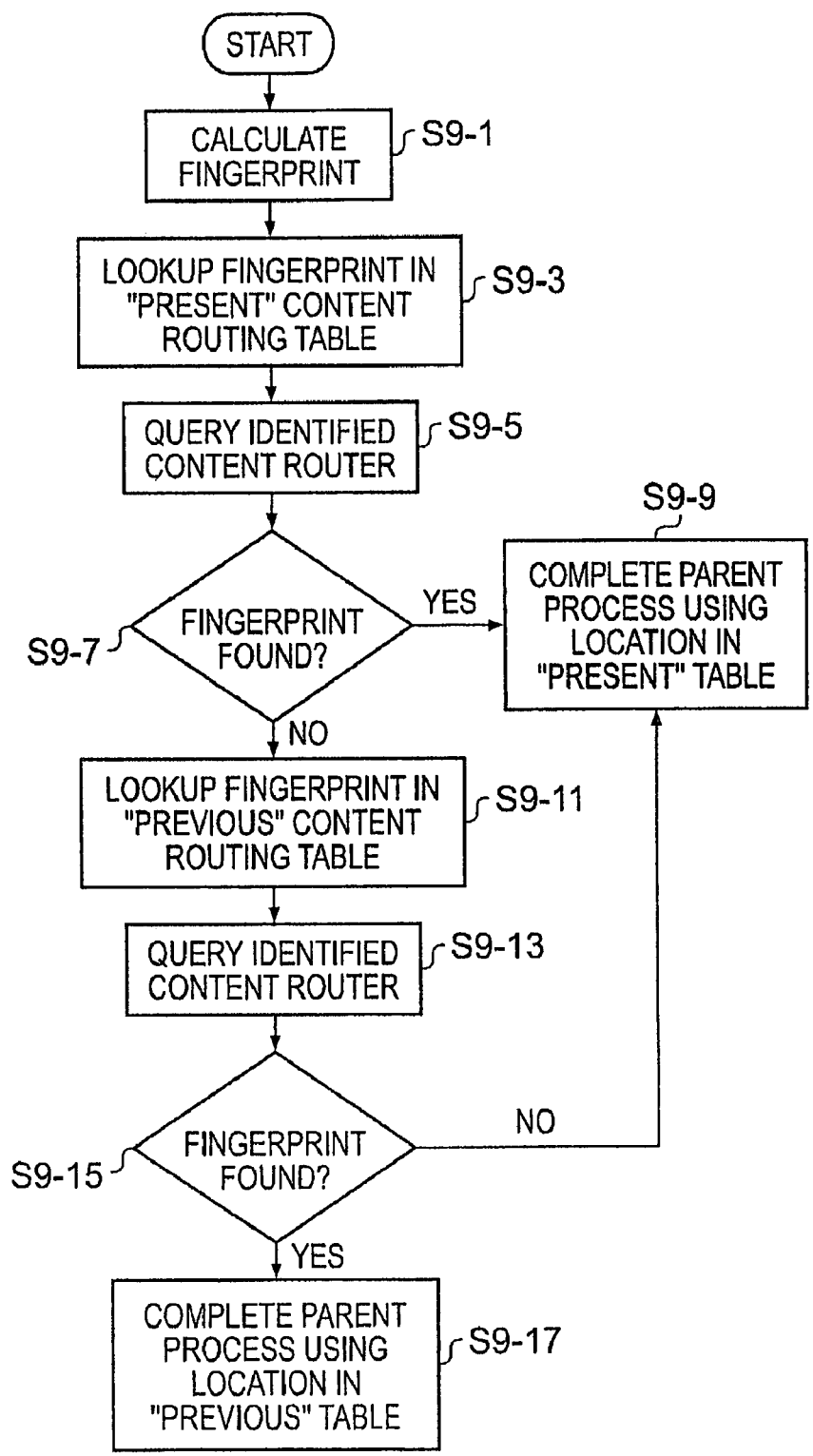
FIG. 9 is a flow diagram illustrating a present and previous content routing system for use during a dynamic resizing operation.

As mentioned above, during a dynamic reconfiguration of the backup/archival system, a new content router may be pressed into service as soon as it is connected. In this situation it will be appreciated that the amount of data actually stored at the new content router will be very small initially, with the amount increasing as the copy from the existing content router(s) proceeds. Moving large quantities of data can take a considerable period of time, especially where data integrity is a high priority, for example moving 1 TB of data from one content router to another could take up to 1-2 days. During this time, a given file/segment may be available from either the original or the new content router. To handle this situation a present and previous system can be implemented, as will now be discussed with reference to FIG. 9.

The present and previous system can be implemented using two content routing tables at each storage agent. The "present" table gives the location of the data as it will be once the resizing operation has been completed and the "previous" table gives the location of the data as it was before the resizing operation started. It will therefore be appreciated that the "present and previous" system may also be considered to be a "future and current" system.

A query directed to the content routers therefore commences at step S9-1 with a fingerprint being determined for the file/segment being considered. This fingerprint is then looked-up in the "present" content routing table at step S9-3. The content router identified in the "present" table is then sent a query containing the fingerprint at step S9-5. A response from that content router is then considered at step S9-7. If the content router returns a result indicating that it has a stored file/segment with that fingerprint then processing continues at step S9-9 where the parent process (e.g. a write operation, a re-write operation or a retrieval operation) is completed using the content router found in the "present" table. Thus the file/segment has been found to be in its "new" location and the operation is carried out on that location.

If, on the other hand, the content router returns a result indicating that it does not have a stored file/segment with that fingerprint then processing continues at step S9-11 where the fingerprint is compared to the "previous" content routing table. The content router identified in the "previous" table is then sent a query containing the fingerprint at step S9-13. A response from that content router is then considered at step S9-15. If the content router returns a result indicating that it does not have a stored file/segment with that fingerprint then processing continues at step S9-9 where the parent process (e.g. a write operation, a re-write operation or a retrieval operation) is completed using the content router found in the "present" table. Thus, if the file/segment is stored nowhere, the operation is carried out with reference to the desired location for that file/segment under the new content routing table.

If, on the other hand, the content router returns a result indicating that it does have a stored file/segment with that fingerprint then processing continues at step S9-17 where the parent process (e.g. a write operation, a re-write operation or a retrieval operation) is completed using the content router found in the "previous" table. Thus the file/segment has been found not yet to have been moved to be in its "new" location and the operation is carried out the "old" location.

Optionally, a check can be performed between steps S9-11 and S9-13 to determine whether the content router identified by the previous content routing table is the same as the content router identified by the present content routing table. If the same content router is identified by both tables, the second query step and subsequent consideration of the result (steps S9-13 and S9-15) can be ignored and the "present" table used to complete the process (step S9-9). This is because if the first identified content router did not have the file/segment and the same content router is identified for the second check, the file/segment is not going to be found at the second attempt, and thus the result of the second query is already known. Thus an unnecessary query can be avoided, saving both query channel bandwidth and load at the content router.

Thus there has now been described a system and method for dynamically resizing a content routing based backup/archival system. During a resizing operation, queries can be run against both new and old locations for a given content item to ensure that the integrity of the backup/archival system is maintained.

Figure 10:
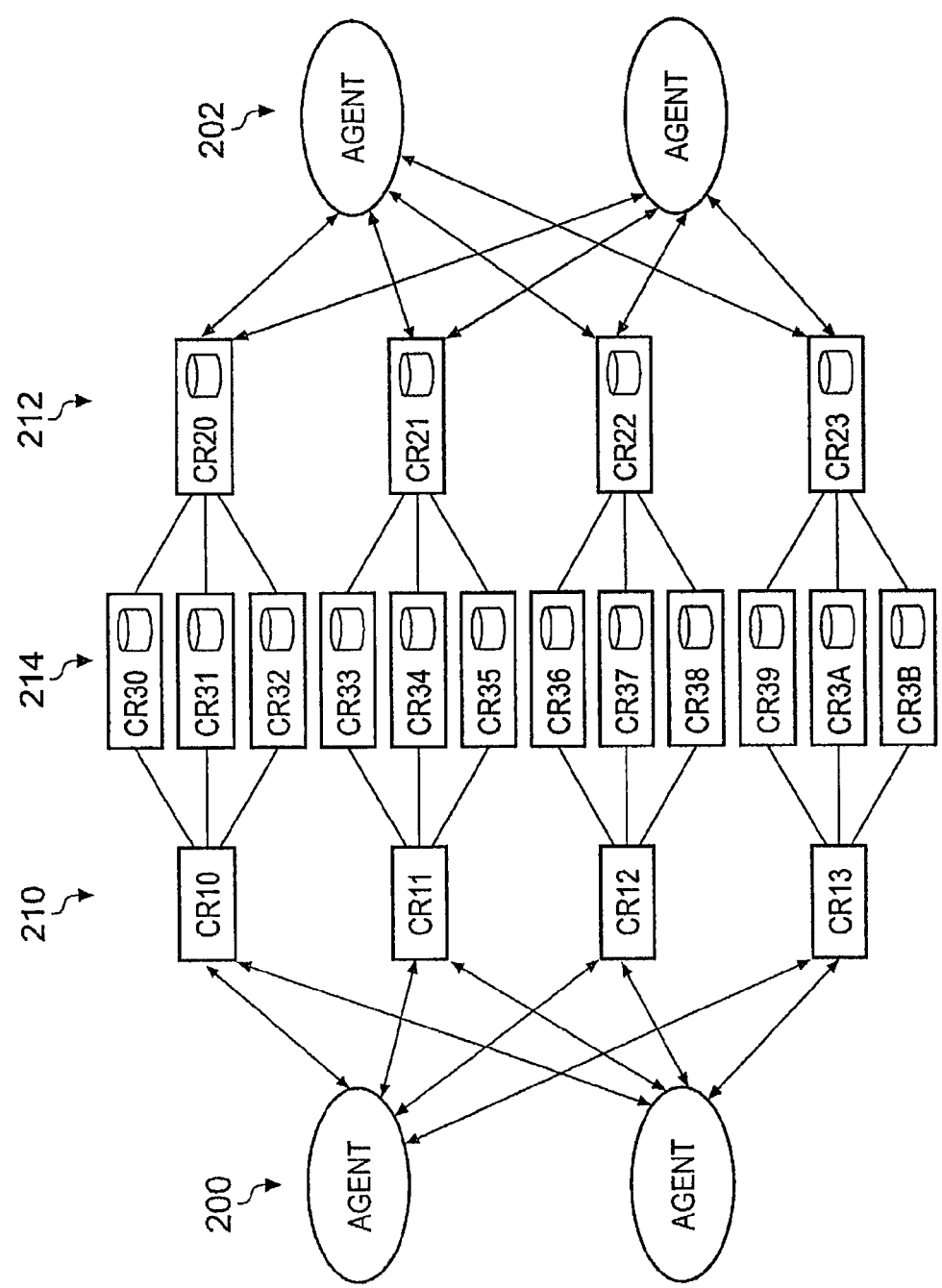
FIG. 10 shows a schematic representation of a three-tier content routing system.

Although it has been described above that the content routing table is distributed to all storage agents, it is not necessary to provide the same content routing table to all agents. This might be appropriate where a system of stacked content routers is used. Thus a first group of storage agents might be directed to a first group of content routers and the second group of storage agents might be directed to a second group of content routers, where each of the first and second content router groups have links to a third group of content routers which handle the actual data storage. Thus queries from agents in different physical locations can be handled by different front-end content routers, with the different front-end content routers all being connected to back-end content routers which handle the actual data storage and retrieval. This possibility is illustrated in FIG. 10, where a first group of agents 200 connect to a first front-end group of content routers 210 and a second group of agents 202 connect to a second front-end group of content routers 212. Additional data storage is provided by a third group of content routers 214. Thus, in the present example where there are a total of 16 storage nodes (content router group 210 do not have storage), the path from a given agent to the required node may be long and pass through one or more content routers which are not the allocated content router for that data. For example, if a fingerprint leads to CR22, an agent in group 202 can access this content router directly. However, for an agent in group 200, the content routing table therein will indicate CR12 as the correct content router. At CR12 a different content routing table will indicate one of CR36, CR37 or CR38 as the correct router. The one of CR36, CR37 or CR38 may be defined in the content routing table at CR12 in dependence upon a query handling capacity of each of those nodes. In one example, the fingerprints for which CR22 is the ultimate content router for may be split equally between CR36, CR37 and CR38 in the content routing table at CR12. For the purpose of this example, we will assume that CR38 is selected. Then, at CR38 the fingerprint is compared to the content routing table and CR22 identified. Finally, at CR22, the fingerprint is compared to its content routing table which indicates that the correct node has been reached. The query or operation can now be carried out and the result returned to the requesting agent.

Different content routing tables for different agents may also be used where the agent is in fact within a content router within a stacked content router system such as that illustrated with reference to FIG. 7 above. Each content router which has other content routers attached will need a content routing table to determine which connected content router a query or data for storage should be forwarded to. In a multi-level stacked system, where there are many cross-links between content routers, there may be preferred paths established for different fingerprints between any two given routers. Different content routing tables may also be used where an agent is used within the storage system for data replication rather than data storage.

Although it has been described above that each content router has storage element(s) associated therewith, this is not necessary and some content routers may have no storage elements associated therewith. Such content routers may typically be deployed as intermediary content routers in a stacked arrangement of content routers. This is illustrated in FIG. 10, where the first front-end group of content routers 210 have no storage associated therewith, whereas the second 212 and third 214 groups of content routers do have storage associated therewith.

Thus there have been described various approaches to implementing a content routing system for a file archival/backup system. Thereby a greater efficiency of storage can be effected in the archival/backup system.

The process of sending a file or segment to a central backup server for backup is, in the present examples an extremely bandwidth efficient operation. This will be discussed in more detail with reference to FIG. 11.

Figure 11:
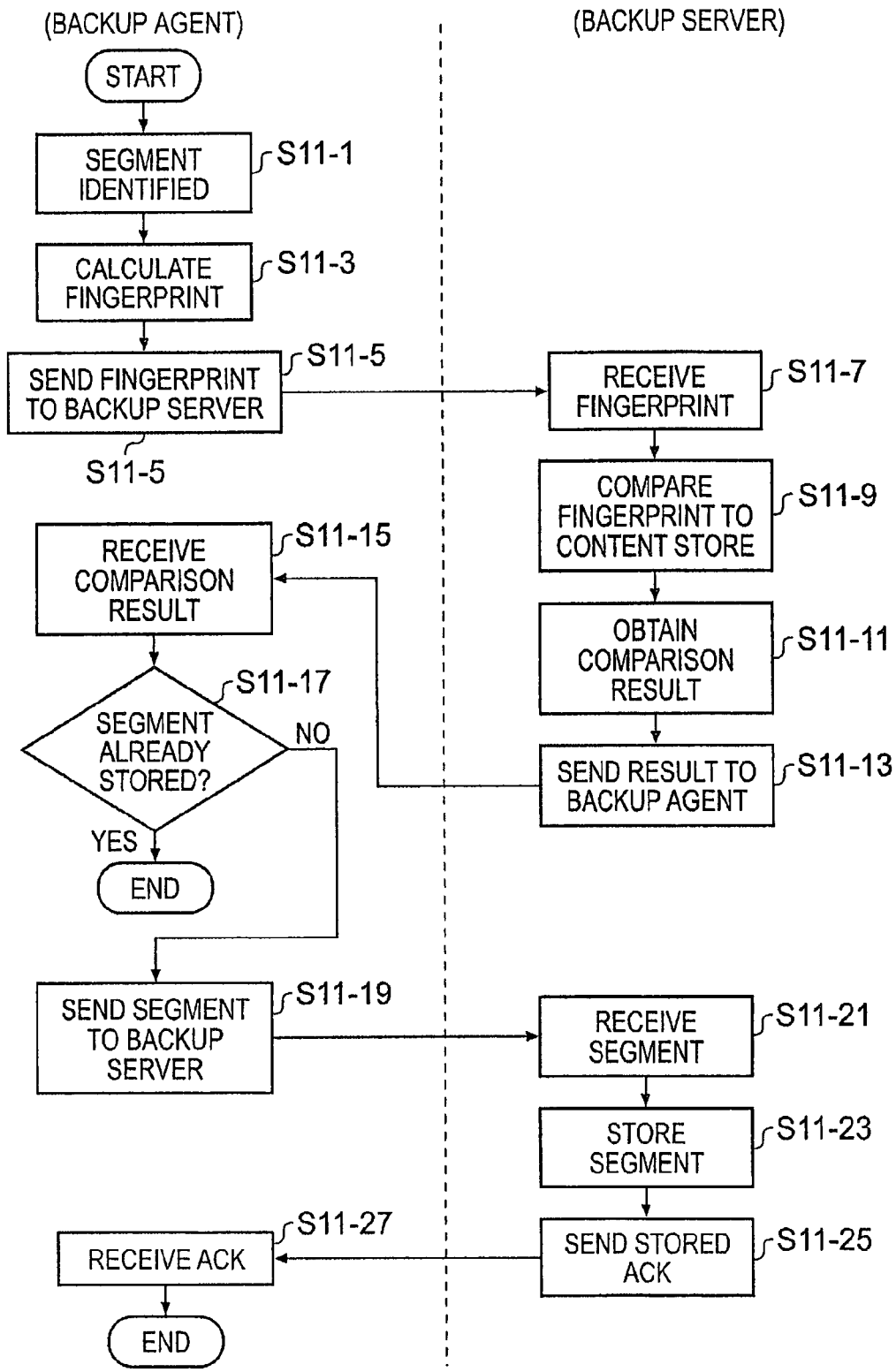
FIG. 11 is a flow diagram illustrating a decision making process for whether to send a segment for backup storage.

FIG. 11 shows a flow diagram of the various steps carried out between a backup agent and backup server over a particular segment identified by the agent as locally unique (i.e. unique to that agent).

The illustrated process commences at step S11-1 with the segment being identified for backup. A fingerprint for this segment is then calculated at step S11-3. It will be understood that the creation of a fingerprint may be an integral part of a segmentation process such that steps S11-1 and S11-3 may in some implementations be performed together or in reverse order.

The fingerprint for the locally unique segment is then sent from the backup agent to a backup server at Step S11-5. In the context of the above described examples, it will be appreciated that the backup server may be a content router and that the backup server selected to receive the fingerprint from the backup agent may be selected on the basis of at least a part of the value of the fingerprint.

This fingerprint is received by the backup server at step S11-7, whereafter it is compared to the content store at step S11-9 to determine whether a segment having that fingerprint is already stored in the content store. Thus a comparison result is obtained at Step S11-11, which result is sent from the backup server to the backup agent at step S11-13.

The comparison result is received by the backup agent at step S11-15, and at step S11-17 the comparison result is analysed to determine whether the segment is already stored. If the segment is already stored, there is no need to store it again, so the process ends. If on the other hand the segment is not stored, then it needs to be. Thus, at step S11-19 the segment itself is sent to the backup server, and is received by the backup server at step S11-21. The backup server then stores the segment at step S11-23 and, at step S11-25, sends some form of acknowledgement to the backup agent indicating that the segment has been stored. Upon receiving the acknowledgement at the backup agent at step S11-27, the process ends.

In some examples, the analysis of the comparison result may be made at the backup server, with the server returning to the agent an instruction to send/not send the segment for storage.

Thus it is clear that until it is has been definitively determined that the segment does need to be stored, only the fingerprint is sent from the agent to the server, thus minimising the network bandwidth utilised by the backup process. This method for determining when to send data for storage provides that, in a typical large corporate network employing such a backup system, only approximately 1% of all new data created on the network actually gets sent to the storage server, with 100% of the globally unique data being sent for backup storage. This is a factor of 10 improvement over traditional backup systems. As the fingerprint of the present example is only a few bytes long (128 bits in one example), the amount of traffic created by the backup process is extremely small.

This system allows a large number of backup agents to be used, each communicating with one or more of a large number of backup servers (which may be content routers as discussed above) on a single network without the day to day functionality of that network being impeded by backup system traffic. Thus conventional network functionalities such as file access systems, email systems, media delivery systems, VOIP systems etc can all be used over the same network as the backup system without the backup system impeding the performance of those conventional systems.

As is clear from the above, one or more content routers can be used in a variety of configurations to allow a backup/archival system to be implemented in a flexible and expandable fashion.

In the present example, management of the data stored at each content router can be performed in a way which is applicable to any commonly used computer operating system (including Unix™ and Unix-like systems such as Linux™, Irix™, IBM AIX, HP HP-UX and Solaris™ as well as Microsoft Windows™ operating systems). In the present example, each content router stores the data files/segments within a storage structure in non-volatile memory and creates an index for identifying where each file or segment can be found within that data structure. A copy of the index can be held in fast volatile memory, such as system RAM, for searching rapidly through the index using the fingerprint of the file/segment being searched for.

In the present example, the storage structure uses a system of nested directories to hold the stored data. Each directory in the structure may be described as a container. In general, there is no difference between a container and a conventional filesystem directory/folder, but for optimum clarity the present disclosure refers to containers and endpoint containers in order to distinguish respectively between directories that contain only other directories and directories that contain only data.

The structure is set out as follows:

/Storage/Datakcontainer>/ . . . /<endpoint container>/<data>

The /Storage/Data/ part of the structure is effectively a /StorageRoot/ directory within the filesystem, and therefore is the means by which the storage region of the filesystem is separated from, for example, operating system and application software areas of the filesystem (if any).

Within the storage structure, each container exists for storing data or other containers. These two container types are distinguished into endpoint containers which store data only and containers which store other containers (containers or endpoint containers) only. Thus endpoint containers are the only locations where actual data is stored.

Each endpoint container can contain data files and includes an endpoint container log to detail the data files stored therein. In particular, the endpoint container log file may contain the mapping between the data fingerprint and a path identifier assigned to the data described by that fingerprint. The contents of the endpoint container log may be used to perform various types of analysis of the data stored inside the endpoint container (such as verification of the stored data), recovery of the assigned path and file identifiers to rebuild an index database that contains the mapping between the assigned identifiers and fingerprints.

When a new piece of data (file, file segment etc) is to be stored, it is assigned a combination of two identifiers. The first identifier is the path identifier which specifies the endpoint container in which the data is to be stored. The second is a file identifier which specifies the location of the data in the storage endpoint container. Together, these two identifiers specify a unique (in the context of a single backup/archival systems) address of a stored piece of data in the storage system.

The maximum value of a file identifier is described by the FMAX value, which determines the maximum number of files that may be stored in an endpoint container. Another value, the DMAX value, identifies the maximum number of containers that may be stored in another container. The purpose of these two values is to configure the algorithms described in the following paragraphs and govern the level of container nesting such that optimal filesystem performance is always reached, regardless of the number of data pieces that resides in the storage system.

When a new piece of data is to be stored in the storage system, it is first determined if the current file identifier exceeds the FMAX value. If this is the case, the file identifier is reset to one, the path identifier is incremented by one and a new endpoint container is created. If this is not the case, the file identifier is incremented by one. Thus, on a virgin storage system, the first piece of data to be stored will have a path identifier of zero and a file identifier of one.

These identifiers can subsequently be stored in a database system, together with the fingerprint of the corresponding piece of data. It will be appreciated that a single database query for a given fingerprint will return the unique set of identifiers for that fingerprint.

As is thus clear, path identifiers are assigned in sequential order to new pieces of data (segments/files) that are to be stored. This means that that the assigned path and file identifiers do not specify a physical address on storage (a file name), and a transformation needs to be applied in order to translate the assigned path and file identifiers to a physical storage address.

The transformation occurs as follows: given a path identifier, the path identifier is divided by the DMAX value. The modulus (integer component) of this division determines the last container name. This is repeated as long as the path identifier is larger than the DMAX value.

In pseudo code, the algorithm can be described as follows:
Initialize a string, called physical location, initially containing the file identifier only.
While (path identifier larger than zero)
Container=modulus (path identifier, DMAX)
Prepend the obtained container to the physical location.
Path identifier=integer result of path identifier divided by DMAX
Prepend the /StorageRoot/ value to the physical location.
So given a path identifier of 257, a file identifier of 42 and a DMAX value of 128, the physical location then becomes /StorageRoot/1/2/42

In essence, the algorithm described above introduces a DMAX based numerical system, thereby allowing a large physical storage location to be represented by two integer values It will be appreciated that once the DMAX and FMAX values have been assigned for a given storage system, they would not normally be changed as to do so would create an entirely new numeric system as altering the DMAX value would alter the size of each container. However, if it were required to change these values, a system could be reconfigured to use the new values, with all previously stored data re-stored using the new system so as to create a valid address under the new numbering system. Alternatively, a system could be managed such that, for example containers 1 to 5 use a first DMAX and FMAX value set and all further containers use a second DMAX and FMAX value. The mathematics of handling this scenario would be more complex than a simple system with single DMAX and FMAX values, but would provide flexibility for reconfiguration of an existing system without the need to re-store all previously stored data.

In the present examples, the values of FMAX and DMAX can be selected so as to ensure that each created container (normal or endpoint) always contains approximately the same number of entries. In one example, FMAX is set to be (2xDMAX)−1. If FMAX is chosen such that the resulting directory size is less than the filesystem inode size (or fundamental filesystem block size), the physical location of a stored piece of data is obtained with the least possible physical disk access, in turn providing optimal filesystem efficiency.

Thereby, if the FMAX value is chosen such that the directory information fits into a single block on a disk, the filesystem only needs to read one block from disk for each directory. This in contrast to a conventional filing system in which it is necessary to read multiple times for each directory as the directory grows in size. The endpoint container size limit imposed by the FMAX value prevents this indefinite directory growth, with associated read burden, from occurring.

Returning to the container log, in the present example each record in the log includes the following information for each piece of data stored in the endpoint container in question:
path identifier;
file identifier;
segment/file fingerprint;

checksum of segment/file; and size of segment/file.

Thereby the log includes sufficient information to perform some evaluations and answer some queries relating to the stored data without accessing that data (specifically using the fingerprint, crc and size) and sufficient information to rebuild the index database if necessary (specifically the path and file identifiers).

In order to maintain consistency within the storage structure, a global storage counter record is maintained in the storage entry point (e.g. /Storage/Data/) and contains the FMAX and DMAX values for the storage structure. The global storage counter also contains the most recently assigned path identifiers. This therefore enables new data to be correctly stored to the current "open" endpoint container, unless that endpoint container is full (FMAX value reached) such that a new endpoint container is needed. Dependent upon the DMAX value, this new endpoint container may be created in the same container as the previous endpoint container, or may be created in a different and/or new container.

In order to facilitate recovery if the storage counter record is lost, a storage counter record is also maintained in each endpoint container, and contains the FMAX and DMAX values for that endpoint container. This endpoint container storage counter record also contains the most recently assigned path identifiers. Recovery of the global storage counter record is achieved by visiting each endpoint container and processing the storage counter for that endpoint container. When the last endpoint container storage counter has been processed, the global storage counter is recovered.

Other means of recovery of the global storage counter are also possible. In one example, the contents of the global storage counter may be duplicated at other known locations on the storage system or in a database system.

As an example of the efficiency of the described system, the following example can be considered. In this example, the storage structure may be capable of storing up to 50 million files. This limit is selected arbitrarily as the database size for this many files approaches 4 Gbytes, which is the logical memory address limit for a processor based on a 32 bit architecture. Where a different maximum memory size applies, a different limit can be used. In this example, the FMAX value is set as 255, such that the DMAX value is 128 ((255+1)/2=128). Thereby, to store 50 million files, a maximum of 195313 endpoint containers will be needed. As there can be no more than 128 endpoint containers per container, these endpoint containers will be spread over 1526 (second tier) containers. These 1526 (second tier) containers will themselves be spread over 12 (first tier) containers. These 12 (first tier) containers will sit directly within the StorageRoot directory as they are less than 128 in number.

In a simple implementation, a storage system which is not anticipated to store a particularly large amount of data could be arranged so as to omit the tier containers. Thus a very flat hierarchy of storage would be achieved but all endpoint containers would sit in the StorageRoot directory/container.

Thus there have been described various approaches to implementing an efficient storage enquiry system for a file archival/backup system. Thereby a greater efficiency of operation can be effected in the archival/backup system.

The invention claimed is:

1. A data storage system comprising:
one or more computer systems configured to execute program instructions, wherein the program instructions are executable to:
receive a data object for storage from a remote storage agent;
assign a first identifier to the data object, wherein the first identifier specifies an endpoint container in which to store the data object;
assign a second identifier to the data object, wherein the second identifier specifies a location of the data object within the endpoint container;
determine whether the second identifier exceeds a predetermined value, wherein said second identifier exceeds the predetermined value at least once during execution of said instructions;
in response to determining the second identifier does not exceed the predetermined value:
store the data object in the endpoint container at a location identified by the second identifier;
store a storage location record including the second identifier and the first identifier indicating where the data object is stored; and
increment the second identifier, thereby creating a new second identifier;
in response to determining the second identifier does exceed the predetermined value:
reset the second identifier to an initial value, thereby creating a reset second identifier;
assign the second identifier with the reset value to the data object;
increment the first identifier and create a new endpoint container which is identified by the incremented first identifier;
store the data object in the new endpoint container at a location identified by the reset second identifier;
store a storage location record including the reset second identifier and the incremented first identifier indicating where the data object is stored; and
increment the reset second identifier.

2. The system of claim 1, wherein the program instructions are executable to store the storage location record for the data object in a database of storage location records.

3. The system of claim 2, wherein a maximum number of data objects which can be stored by the data storage system is limited to enable the database of storage location records to be maintained in physical memory of a host computer of the data storage system.

4. The system of claim 1, wherein the storage location record includes a pointer to the particular storage container in which the data object was stored and a unique identifier for that data object.

5. The system of claim 1, wherein the array structure is hierarchical and comprises containers configured to contain other containers and containers configured to contain data objects.

6. The system of claim 5, wherein a plurality of containers for data objects reside within a single container for containers.

7. The system of claim 6, comprising a plurality of tiers of container containers.

8. The system of claim 5, wherein the hierarchical structure is defined using a pair of container size parameters, wherein the pair of container size parameters comprises one parameter to define a maximum number of containers that can exist in a container and one parameter to define a maximum number of data objects that can exist in an endpoint container.

9. The system of claim 1, wherein new data objects received for storage in a container are assigned identifiers in sequential order.

10. The system of claim 8, wherein values of the parameters are set such that directory information for each container fits into a single block on the physical disk which hosts the container array.

11. The system of claim 1, wherein said first identifier is used in a transformation comprising a modulo operation to identify a physical storage location.

12. A method of storing data received at a data storage system, the method comprising:
- receiving a data object for storage from a remote storage agent;
- assigning a first identifier to the data object, wherein the first identifier specifies an endpoint container in which to store the data object;
- assigning a second identifier to the data object, wherein the second identifier specifies a location of the data object within the endpoint container;
- determining whether the second identifier exceeds a predetermined value, wherein said second identifier exceeds the predetermined value at least once during operation;
- in response to determining the second identifier does not exceed the predetermined value:
  - storing the data object in the endpoint container at a location identified by the second identifier;
  - storing a storage location record including the second identifier and the first identifier indicating where the data object is stored; and
  - incrementing the second identifier, thereby creating a new second identifier;
- in response to determining the second identifier does exceed the predetermined value:
  - resetting the second identifier to an initial value, thereby creating a reset second identifier;
  - assigning the second identifier with the reset value to the data object;
  - incrementing the first identifier and creating a new endpoint container which is identified by the incremented first identifier;
  - storing the data object in the new endpoint container at a location identified by the reset second identifier;
  - storing a storage location record including the reset second identifier and the incremented first identifier indicating where the data object is stored; and
  - incrementing the reset second identifier.

13. The method of claim 12, further comprising assigning identifier to new data objects received for storage in sequential order.

14. The method of claim 12, wherein said first identifier is used in a transformation comprising a modulo operation to identify a physical storage location.

15. A computer-readable storage medium storing program instructions executable to:
- receive a data object for storage from a remote storage agent;
- assign a first identifier to the data object, wherein the first identifier specifies an endpoint container in which to store the data object;
- assign a second identifier to the data object, wherein the second identifier specifies a location of the data object within the endpoint container;
- determine whether the second identifier exceeds a predetermined value, wherein said second identifier exceeds the predetermined value at least once during execution of said instructions;
- in response to determining the second identifier does not exceed the predetermined value:
  - store the data object in the endpoint container at a location identified by the second identifier;
  - store a storage location record including the second identifier and the first identifier indicating where the data object is stored; and
  - increment the second identifier, thereby creating a new second identifier;
- in response to determining the second identifier does exceed the predetermined value:
  - reset the second identifier to an initial value, thereby creating a reset second identifier;
  - assign the second identifier with the reset value to the data object;
  - increment the first identifier and create a new endpoint container which is identified by the incremented first identifier;
  - store the data object in the new endpoint container at a location identified by the reset second identifier;
  - store a storage location record including the reset second identifier and the incremented first identifier indicating where the data object is stored; and
  - increment the reset second identifier.

16. The storage medium of claim 15, wherein identifiers assigned to new data objects received for storage are assigned in sequential order.

17. The storage medium of claim 15, wherein said first identifier is used in a transformation comprising a modulo operation to identify a physical storage location.

* * * * *